April 8, 1958 W. L. MORRIS 2,829,586
FOOD SQUEEZER
Filed May 13, 1953
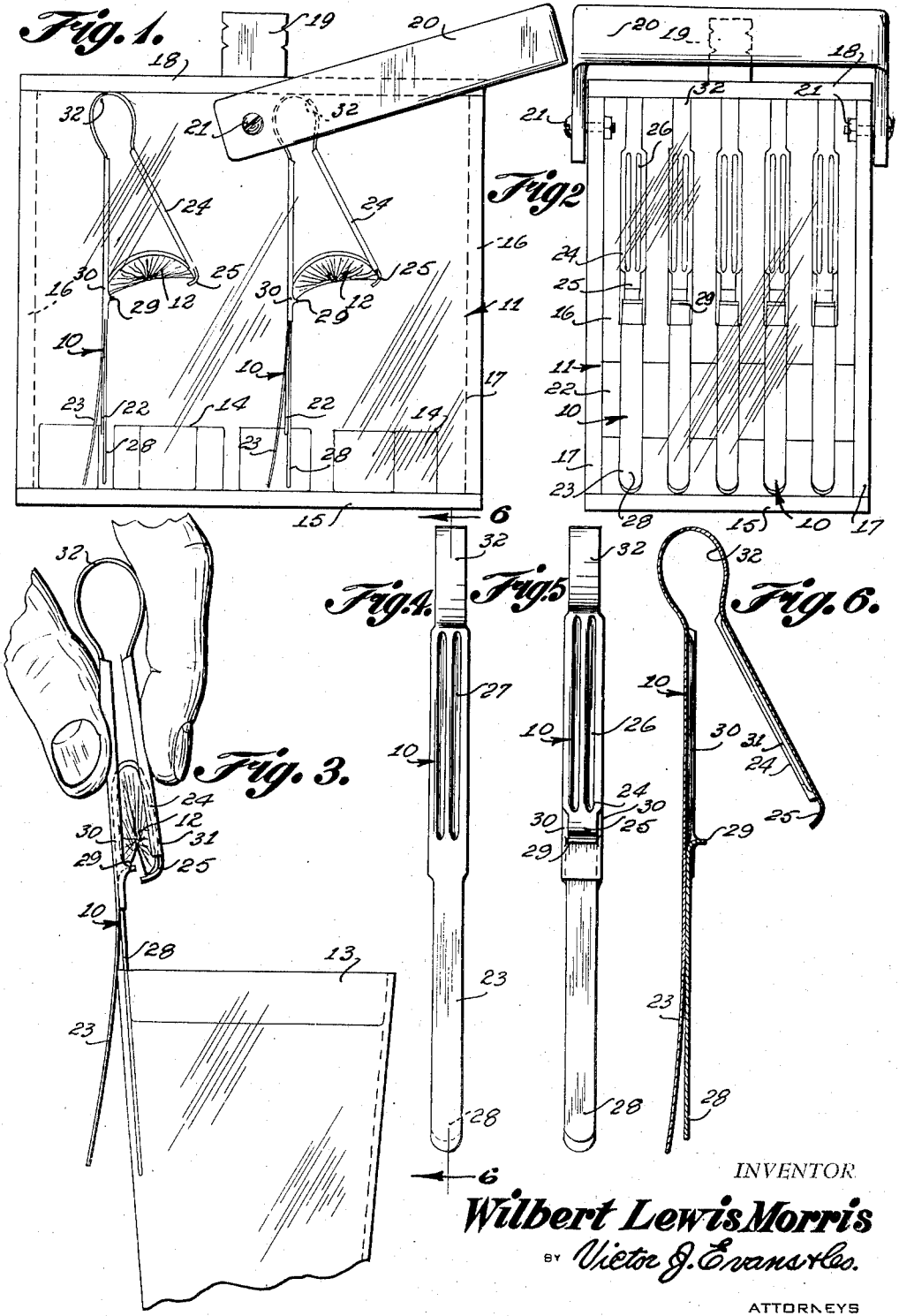
INVENTOR
Wilbert Lewis Morris
BY Victor J. Evans & Co.
ATTORNEYS

United States Patent Office 2,829,586
Patented Apr. 8, 1958

2,829,586

FOOD SQUEEZER

Wilbert Lewis Morris, Washington, D. C.

Application May 13, 1953, Serial No. 354,716

2 Claims. (Cl. 100—133)

This invention relates to a food squeezer, and more particularly to a device for squeezing lemon slices.

The object of the invention is to provide a squeezer for squeezing lemon slices and the like, the squeezer including a clamp whereby the device can be readily attached to a glass that is to receive the juice.

Another object of the invention is to provide a device for extracting the juice from slices or pieces of lemon or other fruits whereby the lemon slices can be squeezed into glasses containing beverages such as iced tea and the like, there being a clamp provided for detachably connecting the squeezer to a glass.

A further object of the invention is to provide a fruit squeezer which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing a plurality of the food squeezers of the present invention positioned in a box or casing.

Figure 2 is an end elevational view showing the food squeezers in the box of Figure 1.

Figure 3 is a side elevational view showing one of the food squeezers of the present invention upon a glass and being used for squeezing a lemon slice.

Figure 4 is an end elevational view of the food squeezer.

Figure 5 is a view looking at the opposite end from Figure 4.

Figure 6 is a sectional view taken on the line 6—6 of Figure 4.

Referring in detail to the drawings, the numeral 10 designates each of the food squeezers of the present invention, and the food squeezers 10 are adapted to be used for squeezing lemon slices 12 so that the juice from such lemon slices can be squeezed into a glass such as the glass 13 which may contain iced tea or other beverage. When the food squeezers are not being used for squeezing juice into glasses they may be conveniently stored in a box or casing 11 which may be made of a suitable transparent material as for example plastic. The box 11 includes a bottom wall 15, end walls 16, and spaced parallel side walls 17. Suitable ice cubes 14 may be arranged in the box 11 for maintaining the lemon slices 12 in a cooled condition until they are to be used. A lid 18 may be detachably mounted on the top of the box 11, and a knob or handle 19 may be connected to the lid 18 for raising the latter. A handle 20 may also be pivotally connected to the box 11 by suitable securing elements 21 so that the box can be carried to any desired location. Suitable spaced parallel bars or strips 22 may extend between the side walls 17 and may be secured thereto for supporting the squeezers 10 in the box 11.

Each of the lemon squeezers 10 includes a piece of resilient material as for example spring metal bent to provide a first leg 23 and a second leg 24, the legs 23 and 24 being mounted for movement toward and away from each other by pressure of the fingers as shown in Figure 3 so that the lemon slice 12 therebetween will be squeezed whereby the juice can be received by any suitable receptacle, as for example by the glass 13. The lower end of the leg 24 is provided with an inwardly extending curved finger 25, and there is also provided a plurality of ribs 26 in the leg 24. An arcuate web 32 interconnects the legs 24 and 23 together, Figure 6. The other leg 23 is also provided with a plurality of ribs 27.

A means is provided for permitting the squeezer to be mounted on a glass such as the glass 13. This means comprises a spring finger 28 which has its upper end secured to the longer leg 23 intermediate its ends. The rim of the glass 13 is adapted to be interposed between the finger 28 and the leg 23 as shown in Figure 3. The upper end of the finger 28 terminates in a transverse inwardly extending lug 29 which coacts with the ear 25 to prevent the lemon slice 12 from accidentally slipping during squeezing thereof. The ridges 27 and 26 also help to hold the lemon slice in place and flanges 30 and 31 on the legs 23 and 24 also insure that the lemon slice will be held in proper position during the squeezing thereof.

From the foregoing it is apparent that a squeezer has been provided whereby the juice of lemon slices 12 or other food can be readily squeezed into glasses such as the glasses 13. When the squeezers are not being used they can be readily supported on the bars 22 in the box 11, and when it is desired to squeeze one of the lemon slices 12 into a glass, the device is removed from the box and placed on the glass as shown in Figure 3. The finger 28 and leg 23 cooperate to form a clamp whereby upon application of manual pressure to the upper portion of the legs 24 and 23 as shown in Figure 3, the lemon slice 12 will be squeezed and the juice therefrom will accurately run into the glass 13.

The curved finger 25 and lug 29 help prevent the lemon from slipping while it is being squeezed and by means of the present invention juices can be squeezed without the necessity of soiling the fingers. Also the ribs 27 and 26 help prevent the lemon from slipping and the flanges 30 and 31 likewise prevent the lemon from spreading sideways as it is squeezed and if desired grooves or knurling may be arranged on the outer surface of the legs 23 and 24 to facilitate the gripping by the fingers so that the fingers do not slip. The lemon slices 12 may be prepared and held by the squeezers and these units can be placed in a box 11 until they are needed and they can be kept cool by the ice cubes 14. The various parts of the box 11 may be rust proof. It will be noted that the lower end of the leg 23 is curved outwardly away from the finger 28 so as to facilitate the insertion of the rim of the glass therebetween.

I claim:

1. A food squeezer comprising a body member made of spring metal and shaped to include a first leg and a second leg, said first leg being longer than said second leg, an arcuate web interconnecting the upper ends of said legs, said legs being spaced apart and mounted for movement toward and away from each other, a plurality of ribs arranged on each of said legs, a curved finger extending toward said first leg from the lower end of said second leg, a clamping finger having its upper portion secured to the inner surface of said first leg intermediate the ends thereof, the lower end of said first leg being curved outwardly away from said clamping finger to facilitate insertion of a rim of a glass between said first leg and said clamping finger, and a transverse lug on the upper end of said clamping finger extending into the space between said legs in a direction substantially toward said curved finger.

2. In a fruit squeezer, a body member made of spring material and shaped to include a first leg and a second leg, said first leg being longer than said second leg, an arcuate web interconnecting the upper ends of said legs, said legs being spaced apart and mounted for movement toward and away from each other, a plurality of ribs arranged on each of said legs, said ribs being arranged in spaced parallel relation with respect to each other, a curved finger extending from the lower end of said second leg toward said first leg, a clamping finger having its upper portion secured to the inner surface of said first leg intermediate the ends thereof, an inwardly extending transverse lug on the upper end of said finger, said lug and curved finger being arranged in substantially confronting relation with respect to each other to define a ledge means for supporting a piece of fruit between said legs, the lower end of said first leg being curved outwardly away from said clamping finger to facilitate insertion of a rim of a glass therebetween.

References Cited in the file of this patent

UNITED STATES PATENTS

| Number | Name | Date |
|---|---|---|
| 455,938 | Davidson | July 14, 1891 |
| 946,668 | Filler | Jan. 18, 1910 |
| 1,083,918 | Bunzl | Jan. 13, 1914 |
| 1,305,806 | Keppeler | June 3, 1919 |
| 1,629,213 | Hughes | May 17, 1927 |
| 1,647,735 | Kennedy | Nov. 1, 1927 |
| 2,255,750 | Whorton | Sept. 16, 1941 |
| 2,404,066 | Hill | July 16, 1946 |

FOREIGN PATENTS

| Number | Country | Date |
|---|---|---|
| 610,923 | Great Britain | Oct. 22, 1948 |
| 642,158 | Germany | June 11, 1937 |
| 815,382 | Germany | Oct. 1, 1951 |